United States Patent [19]

Zukerman et al.

[11] E Re. 29,351

[45] Reissued Aug. 9, 1977

[54] VIDEO-DISPLAY-PROCESSOR

[75] Inventors: Yoram Zukerman; Moshe Ben-Porath; Benjamin Sabbah, all of Haifa, Israel

[73] Assignee: Elscint Ltd., Haifa, Israel

[21] Appl. No.: 544,516

[22] Filed: Jan. 27, 1975

Related U.S. Patent Documents

Reissue of:

[64] Patent No.: 3,794,762
Issued: Feb. 26, 1974
Appl. No.: 266,128
Filed: June 26, 1972

[51] Int. Cl.[2] ..... H04N 3/04; H04N 5/76

[52] U.S. Cl. ..... 358/81; 235/92 PC; 358/93; 358/107; 358/110

[58] Field of Search ..... 178/6.8, 6.7 R, 6.6 A, 178/DIG. 1, DIG. 36, 7.6; 235/92 PC, 92 GC, 92 EA; 340/324 AD

[56] References Cited

U.S. PATENT DOCUMENTS

| | | | |
|---|---|---|---|
| 3,579,249 | 5/1971 | Dewey | 178/6.8 |
| 3,612,886 | 10/1971 | Hanning | 178/7.6 |
| 3,629,495 | 12/1971 | Cahill | 178/6.6 A |
| 3,643,015 | 2/1972 | Davidovits | 178/DIG. 37 |

OTHER PUBLICATIONS

"Nuclear Medicine Instrumentation", ELSCINT, Inc., Edison, N. J., Nov. 1970.

"Image Store NS8", Siemens, Akg. Erlangen, Germany, June 1971.

*Primary Examiner*—Howard W. Britton
*Attorney, Agent, or Firm*—Donald M. Sandler

[57] ABSTRACT

A video-display processor produces an on-line display of the distribution density of radiation stimuli emitted by a radiation field utilizing a probe for detecting the stimuli and a counter for accumulating the number of stimuli detected; and motorized means to cause the probe to traverse the field and sequentially scan a preselected number of elemental areas, each having a preselected size, for causing the probe counter to accumulate the number of stimuli that occurred during the scan of each elemental area. The number of stimuli accumulated during the scan of each elemental area, upon the completion of the scan thereof is transferred into a memory whose contents modulate the picture elements of a raster generated by a CRT of a TV display thus displaying the density of each elemental area immediately after scanning thereof is complete.

22 Claims, 8 Drawing Figures

VIDEO-DISPLAY-PROCESSOR

Matter enclosed in heavy brackets [ ] appears in the original patent but forms no part of this reissue specification; matter printed in italics indicates the additions made by reissue.

This invention relates to a video-display-processor for producing an on-line display of the distribution density of radiation stimuli emitted by a radiation field.

The distribution density of radiation stimuli emitted by an organ of an animal injected with a radio-active pharmaceutical is, in reality, a map of the organ showing the quantity of pharmaceutical present in each elemental portion of the organ. Maps of this type contain significant medical information enabling those skilled in the field of nuclear medicine to study, test and treat various organs of the body.

In order to obtain maps of this nature, it is conventional to immobilize the patient beneath a probe which is caused to scan a region that includes the radiation field constituted by the organ to be mapped. The probe is capable of detecting radiation stimuli emitted by the organ, and includes a counter for accumulating the number of stimuli detected during the scan of each elemental area of the field.

The probe moves linearly at a constant speed in, for example, the (+) X-direction from one limit to another, then is indexed in the Y direction, and proceeds in the (−) X-direction at the same speed to the original limit where it is again indexed in the Y direction. Thereafter, the cycle is repeated until the probe has scanned the entire region between limits in the X and Y directions. The linear speed of the probe and the spacing between line scans are dependent upon the resolution of the collimator associated with the probe and various medical parameters such as the type of organ, the radioactive isotope, etc. As a consequence of all of these factors, a pulse is generated each time the probe traverses a pre-set distance in the X-direction; and this pulse is used to effect the transfer of the contents of the counter associated with the probe into a buffer followed by a resetting of the counter. At the same time, a logic system establishes the address of the probe when the pre-set distance pulse occurs permitting the contents of the buffer to be transferred into a proper location in a memory of a computer.

After the scan is completed, a suitable program in the computer may process the data contained in the memory using various techniques to enhance an understanding of a display thereof, and the processed data is then made available for a black-and-white or color display on a CRT screen. If the operator has selected the proper scan limits relative to the organ to be mapped, and if the parameters of line spacing and linear speed have been properly selected, the display will yield, to trained personnel, the medical information being sought. If, on the other hand, the scan parameters were not properly selected, only a portion of the organ may be mapped due to having selected improper scan limits, or the medically interesting area of the organ may be concealed by reason of having selected the wrong scan speed. In either case, another scan program will have to be carried out. This is very wasteful both medically and economically.

In an effort to provide a technician during the scan operation with a rough check on the quality of the selection of the scan parameters, it is conventional to utilize what is termed a dot-printer that provides a real-time display of the raw data obtained by the probe. A dot-printer is essentially an X-Y plotter that is slaved to the probe and is provided with an output in the form of a hammer that prints a dot on a paper sheet on contact. The number of times the hammer contacts the paper is proportional to the count (i.e., the number of radiation stimuli detected by the probe upon completion of the scan of an elemental area of the radiation field). This expedient will usually indicate whether the limits of the scan have been properly chosen well before the scan of the radiation field is completed. If necessary, the scan can be interrupted, the relative position of the patient and the field scanned by the probe can be adjusted, and then a new scan can be commenced.

The dot printer also provides only a rather crude check on whether the probe speed is proper under the circumstances because the output of the dot-printer is like a half-tone reproduction in which the resolution will depend upon the wisdom of the selection of the proportionality constant between the raw data derived from the probe and the hammer of the printer. Furthermore, since the dot-printer operates on the data as it is inserted into the memory and before it is processed to enhance its understanding (e.g. before a constant is subtracted from the contents of each memory register to eliminate background noise), the dot pattern is only an approximation that often conceals an incorrect probe speed that becomes apparent only after the scan is complete and the data processing carried out.

While nevertheless improving the efficiency of obtaining a scan that will yield the sought after medical information, it is obvious that many medical situations will arise in which there is simply no time to achieve more than one scan. In these cases, the raw data obtained may be insufficient to provide the basis for reaching the necessary medical conclusions. It is therefore an object of the present invention to provide a new and improved apparatus which will not only process the data as it is acquired to produce an on-line display in a form most advantageous for medical analysis, but also will permit the processing to be changed during acquisition of the data, and will permit the scan limits to be adjusted before the scan is completed without losing any of the previously acquired data, thus eliminating the need to restart the scan.

According to the present invention, there is provided a video-display-processor for producing an on-line display of distribution density of radiation stimuli emitted by a radiation field, comprising a probe for detecting the stimuli and a counter for accumulating the number of stimuli detected; motorized means to cause the probe to traverse the field and sequentially scan a preselected number of elemental areas, each having a preselected size, for causing the probe counter to accumulate the number of stimuli that occurred during the scan of each elemental area; a memory; means for transferring into the memory the number of stimuli accumulated during the scan of each elemental area upon the completion of the scan thereof; a TV display having a CRT with a viewing screen and means to periodically generate a raster of modulatable picture elements on the screen prior to completion of the scanning of all of the elemental areas of the field; and means for modulating the picture elements in accordance with the contents of the memory.

The beam of the CRT begins to generate a new raster at a rate which is many orders of magnitudes greater than the rate at which scan data is acquired. Consequently, the number of stimuli occurring during the scan of a given elemental area of the radiation field can be stored in the memory, read-out, processed for enhancing the display, and used to modulate the picture element corresponding to the given elemental area practically simultaneous with its acquisition. The display thus builds up, point-by-point as the scan progresses, permitting an early decision to be made on whether to complete the scan or start a new one.

The memory is preferably constructed in the form of a plurality of shift registers whose contents are circulated through a complete cycle in synchronism with the generation of the TV raster, thus permitting control to be exerted over the shifting of the memory prior to the initiation of the generation of the raster. By shifting the memory prior to initiation of the generation of the next raster by an amount related to the shift of the limits of the probe, the data acquired prior to the shifting of the limits is retained and displayed in proper spatial relationship to the data acquired subsequent to such shifting.

An embodiment of the invention is illustrated by way of example in the accompanying drawings, wherein.

Figure 1:
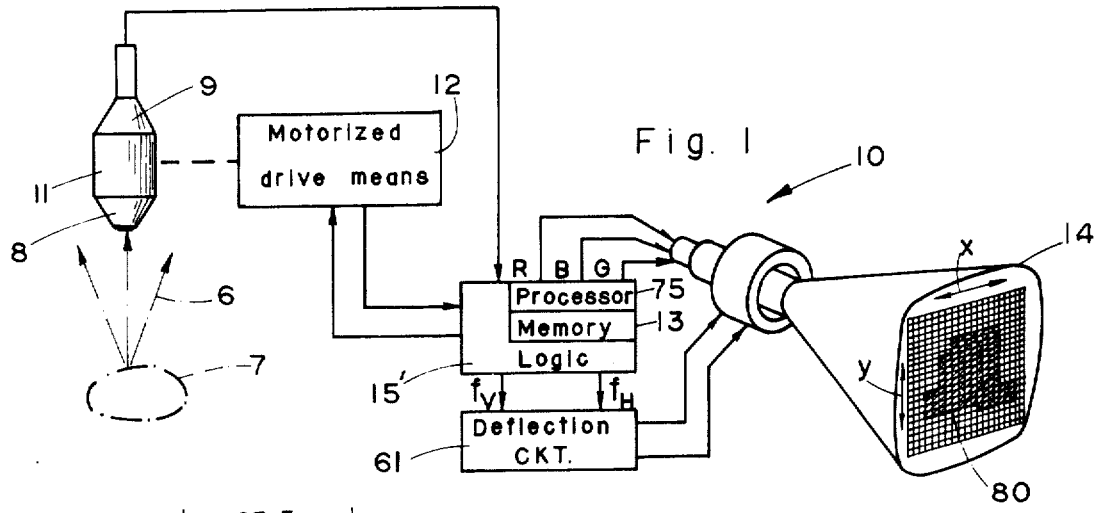
FIG. 1 is a block diagram of the video-display-processor according to the present invention.

Referring now to FIG. 1, reference numeral 10 designates a video-display-processor according to the present invention comprising a probe 11, motor means 12, a memory 13, a TV display tube 14, and means 15' for controlling the operation of the various components.

Probe 11 preferably comprises a standard detector such as a 5 inch diameter, 2 inch thick NaI (TI) crystal provided with a thin window that efficiently transmits low energy photon radiation such as derived from $^{125}I$. The crystal is integrally assembled into unit with a 5 inch photo multiplier 9; and a suitable collimator 8 is provided in accordance with the energy level of the source and the fineness of the focus decided upon for medical reasons. The probe is positioned above an immobilized patient 7 previously injected with a radioactive pharmaceutical and in the vicinity to receive radiation stimuli 6 emanating from the patient's organ within which the pharmaceutical has been absorbed.

Figure 2:
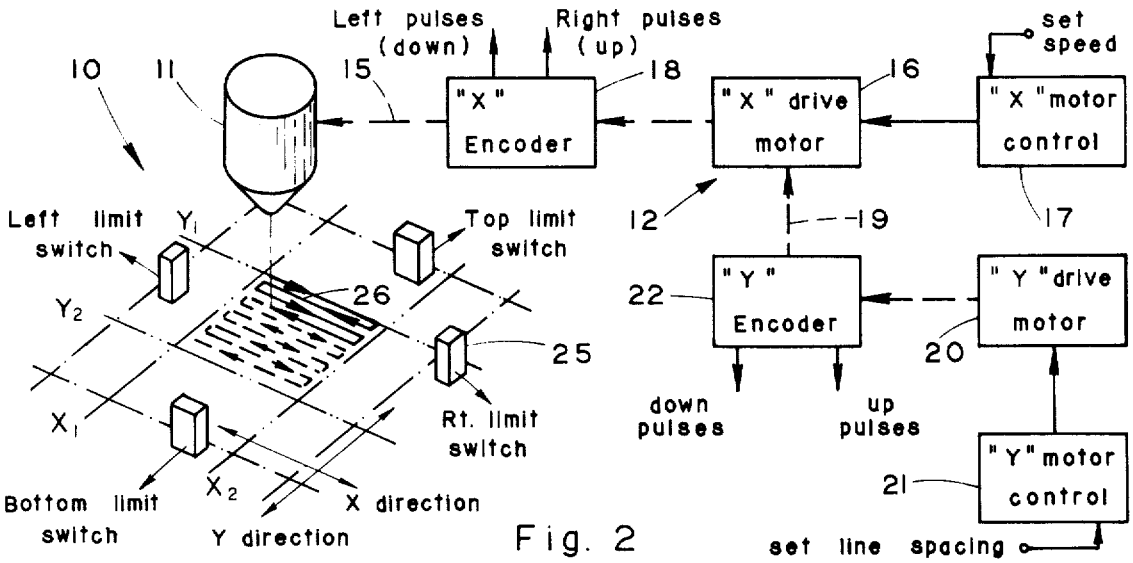
FIG. 2 is a schematic block diagram of the logic for controlling the movement of the probe.

Motor means 12, shown best in FIG. 2, comprises a carriage (not shown) displaceable in the direction of the Y-axis and carrying a precision shaft 15 whose rotation drives probe 11 in the direction of the X-axis through a linear distance proportional to the angular displacement of the shaft. Shaft 15 is driven by a motor 16 whose operation is controlled by control circuit 17. An encoder 18 associated with the shaft converts the angular rotation thereof to pulses that provide digital information on the X location of the probe and its direction of movement along the X-axis. The carriage is driven in the direction of the Y-axis by precision shaft 19 whose rotation by motor 20 is controlled by control circuit 21. Another encoder 22 associated with shaft 19 provides digital information on the Y location of the carriage and hence the Y location of the probe as well as its direction of movement along the Y axis.

In operation, motor means 12 drives the probe 11 in the X direction at a speed dependent upon the maximum count rate in the area to be scanned, and such medical factors as the type of collimator and the scan time within which the scan must be completed. Encoders 18 and 20 each produce one pulse per unit distance traversed by the probe in the X and in the Y direction, respectively. For example, each encoder may produce one pulse per 0.1 millimeter displacement of the probe, and the resultant pulses appear at the "up" or the "down" terminals of the encoder depending upon the direction of movement of the probe. The distance traversed by the probe from one line in the X direction to the next line is termed the line spacing, and this parameter is also dependent on medical factors such as the type of collimator, etc.

Two sets of constraints are imposed on the movement of the probe as it scans a radiation field. One set is established by the physical limitations of the shaft 15 and 19, and such limitations are sensed by limit switches 25 of which a pair are associated with the shaft 15 to define the left hand right limits of the probe, and a pair are associated with the shaft 19 to define the up and down limits of the probe. The other set of constraints is established by the operator so that a field less than the entire field defined by the limit switches 25 can be scanned. For convenience, these limits are termed X1 and X2 in the X direction, and Y1 and Y2 in the Y direction.

Figure 3:
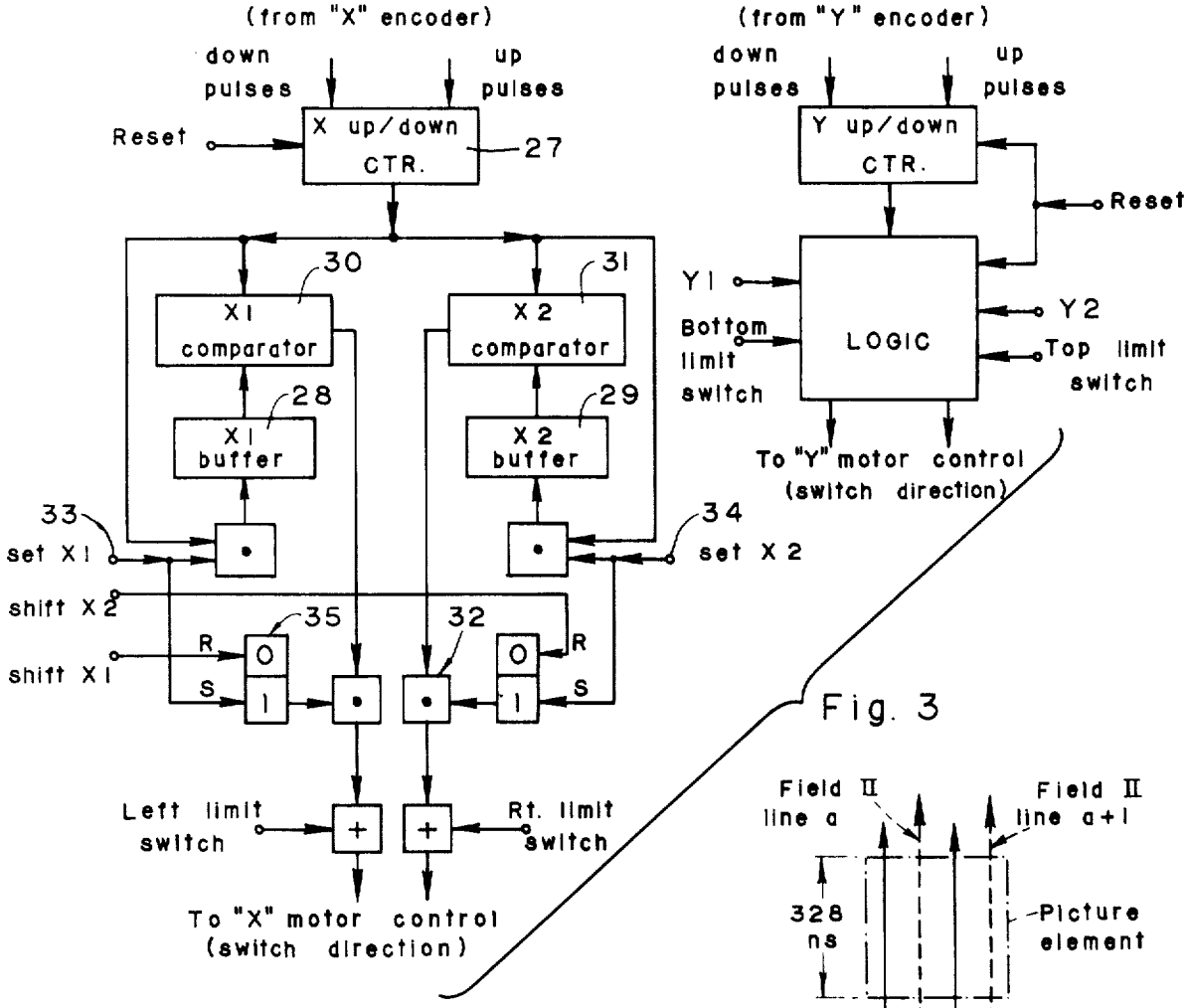
FIG. 3 is a schematic block diagram showing the logic by which limits are established for the probe in both the X and Y directions.

By reason of the logic of FIG. 3 the probe is caused to traverse the path defined by lines 26 in FIG. 2. The control of the probe in the X direction is shown in detail in FIG. 3, it being understood that control of the probe in the Y direction is similar. Pulses produced by encoder 18 as the motor 16 drives the detector 11 in the X direction are accumulated in up/down counter 27. When the contents of counter 27 is identical to the contents of either of registers 28 or 29, the appropriate comparator 30 or 31 produces an output pulse which, if gate 32 is enabled, causes the motor control 17 to switch the direction of rotation of the motor 16. An operator selects the XL limit, for example, by providing a high level at line 33, thus enabling the transfer gate associated with register 28, when the probe 11 is located at the appropriate displacement X1. In this manner, the contents of counter 27 is transferred into the register 28 to estalish the X1 limit. Similarly, the operator may select the X2 limit by providing a high level at line 34 which will transfer to the register 29 the contents of counter 27 when the probe 11 is at the desired X2 location. Having selected the limits X1 and X2 and set control flip-flops 35 to enable gates 32, the pulses derived from comparators 30 and 31 may pass through the gates 32 and effect the reversal of the X drive motor 16. In the absence of selecting the limits X1 and X2, the closing of either the left limit switch 25 or the closing of the right limit switch 25, will also cause the motor control 17 to reverse the direction of rotation of motor 16.

Sometimes partially through a scan, an operator discovers that a medically interesting area is beyond the limits which have been imposed on the scan, and in such case provision is made for changing the limits of the scan. For example, the limit X1 may be changed during the scan towards this limit when an operator depresses an X1 shift switch (not shown) and resets the control flip-flop 35 associated with the X1 comparator 30 disabling the gate 32 associated therewith. The motor 16 will thus be able to drive probe 11 beyond the original limit X1 because the pulse produced by the comparator 30, when the original limit X1 is reached, will be blocked by the disabled gate 32. The motor will continue to drive the probe, either until the left limit switch is reached or until the operator releases the shift switch applying a high level once more at line 33, setting flip-flop 35 and effecting the transfer of the current contents of counter 27 into register 28. The output pulse from comparator 30 will then pass through the newly enabled gate 32 thus changing the direction of the motor. The X2 limit may be changed in a similar manner.

Before describing the manner in which data is acquired from the radiation field and displayed on the TV screen, reference is again made to FIG. 1 in order to illustrate some of the design considerations involved in the present invention. First of all, the present invention is designed to utilize a television tube meeting the current standards of the F.C.C. in the United States. Such standards include a 525 line raster with each frame of the raster comprising two interlaced fields of 262.5 lines each, each field being initiated by a vertical sync pulse whose frequency is about 60 Hz. The line scan of the TV tube is controlled by horizontal sync pulses whose frequency is 15.75 KHz.

Figure 8:
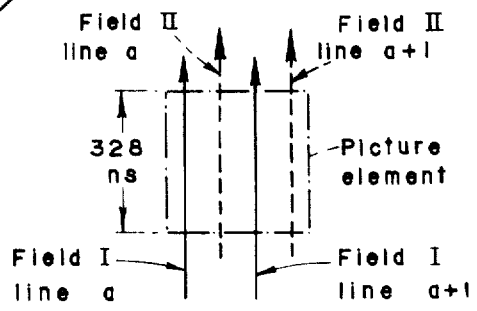
FIG. 8 is a schematic representation of a typical picture element on the TV tube.

The tube 14 is oriented so that the raster lines are vertically positioned rather than horizontally positioned as is usually the case, and the display is composed of 12,288 picture elements located between lines 34 and 226 (192 lines in all) covering about two-thirds of the length of each line. As shown in FIG. 8, two lines (a and a + 1) of each field (identified as fields I and II) are required to define a single picture element. As a consequence, the display comprises an array of 96 picture elements in the X direction (two lines per element) and 128 elements in the Y direction along a line.

The radiation field scanned by the probe is likewise comprised of an array of 12,288 elemental areas arranged in an array 96 and 128, with the 96 elemental areas being arranged in the X direction. The size of the TV display is fixed, but the actual size of the radiation field that can be scanned to provide this display will vary in size according to the line spacing of the probe and the speed at which scanning takes place.

The width of each elemental area (termed the preset distance) is established by the scan speed which is a function of the line spacing (which spacing depends on the collimator being used) and the maximum count that the scan of any elemental area is to yield. In usual cases, the distance between the operator selected limits X1 and X2 will be less than 96 times the preset distance with the result that less than 96 elemental areas will be scanned during the traverse of the probe from X1 to X2 permitting the limits to be increased if necessary. The X address of an elemental area is thus the number of preset distances of the elemental area from X1. The Y address of an elemental area is the number of preset distances from Y1. Once the scan parameters are set, the output of encoder 18 can be processed by logic 40 as shown in FIG. 4 to produce one pulse each time the probe traverses a distance equal to the preset distance in the X direction; and the output of the encoder 19 can be processed by logic 41 to produce one pulse each time the probe traverses a distance equal to the preset distance in the Y direction.

Figure 4:
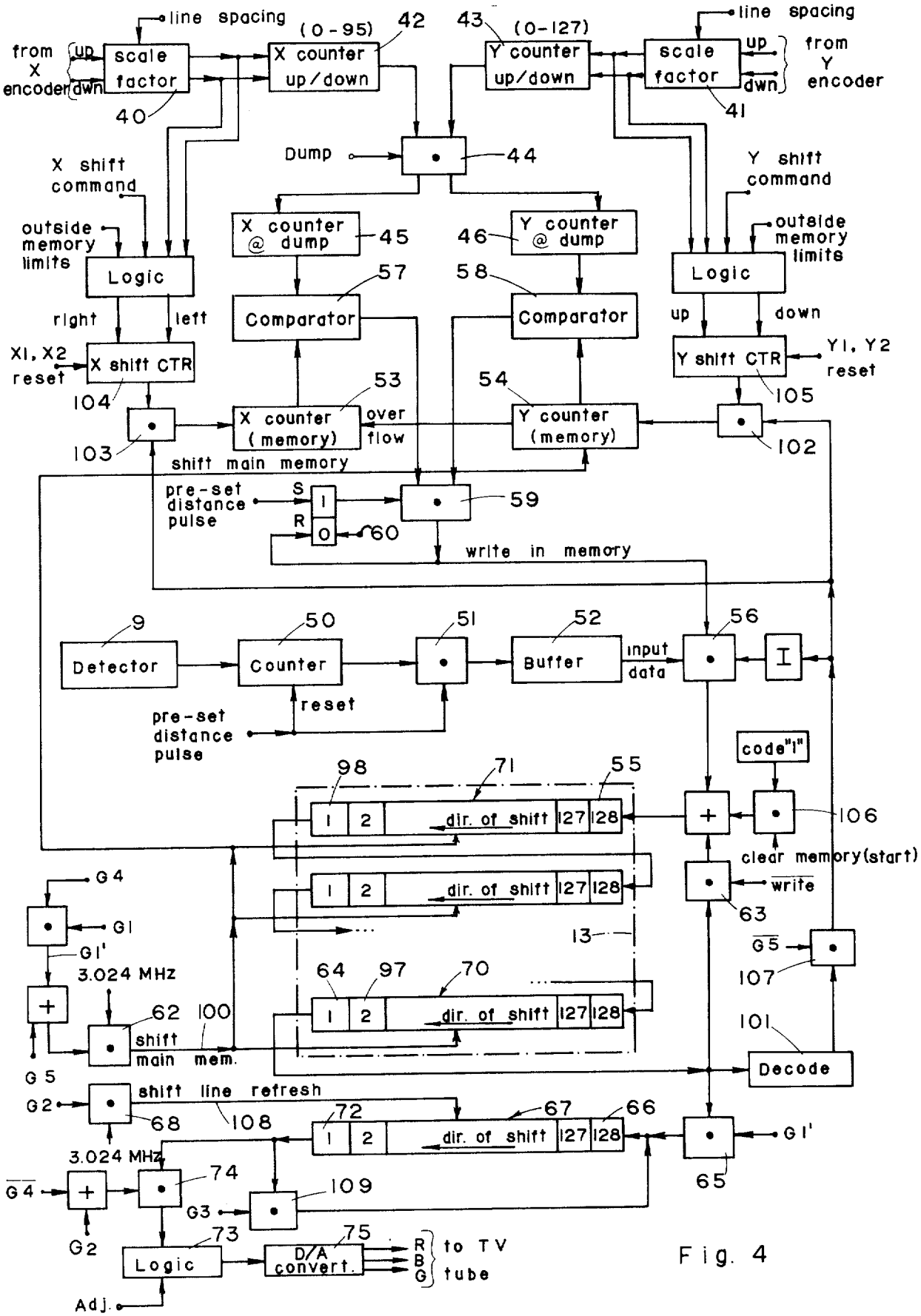
FIG. 4 is a schematic block diagram showing the logic by which the output of the detector can be inserted into the proper location in the memory and the logic by which the contents of the memory may be read out for the purposes of modulating the picture elements of the TV display tube.

The X address of the probe is derived as shown in FIG. 4 in counter 42, and the Y address is derived in counter 43. To facilitate the explanation, it will be assumed that counter 42 counts from 0–95 before overflowing, that counter 43 counts from 0–127 before overflowing, and that both counters are cleared when the limits X1 and Y1 are selected. In such case, the contents of these counters, when a preset distance pulse occurs, will be the address of the elemental area whose scanning has just been completed. Such a pulse enables gate 44 whereby the contents of counter 42 is transferred to buffer register 45 and the contents of counter 43 is transferred to the buffer register 46. Thus, these buffers will contain the address of the last elemental area scanned by the probe.

The count (i.e., the number of radiation stimuli detected by the probe) associated with an elemental area is accumulated in counter 50 associated with the detector 9 of the probe. The occurrence of a preset distant pulse enables gate 51 transferring the contents of counter 50 into a buffer register 52 in preparation for transfer into memory 13.

As described in detail below, memory 13 comprises 12,288 shift registers, one for each picture element of the display and elemental area of the scan field.

Turning now to the details of memory 13, it is organized into 96 syllables of 128 words each. A memory word is constituted by the contents of an 8-bit solid-state shift register permitting a count rate as high as 255 to be stored in any register. There are thus 12,288 serially connected shift registers in the memory 13, each of which transfers its contents to an adjacent register upon receipt of a shift pulse in shift line 100. After 12,288 shift pulses, the contents of register 55 at the input end of the memory will have circulated through all of the registers of the memory and returned again via register 64 at the output of the register.

The memory can be shifted whenever gate 62 is enabled to permit a 3,024 MHz clock to be gated into the shift line 100. This gate is enabled by either a G1 control pulse (field shift mode of operation of the memory) or a G5 control pulse (retrace shift mode of operation). In the field shift mode, a total of 12,288 shift pulses are applied to shift line 100 in 96 groups of 128 pulses each. The first shift pulse occurs approximately 11 μs following the horizontal sync pulse associated with the 34th line of the raster on the TV tube; and the last pulse occurs about 10 μs before the horizontal sync pulse associated with the 227th line of the raster. In the retrace shift mode, which is used for synchronization of the memory, sufficient pulses are applied to cause the memory address register to reach the equivalent of 12,288 (i.e. counter 53 contains the number 95 and counter 54 contains the number 127).

Synchronization of the memory with the initiation of the generation of a raster on tube 14 is achieved by detecting the presence of a code word in register 64 of memory 13. When this register contains the code word, it is sensed by decoder 101 enabling both of gates 102 and 103 associated with the memory address register and depositing the contents of shift counter 104 into counter 53 and the contents of shift counter 105 into counter 54. Each of counters 104 and 105 will be reset when the limits X1, X2 and the limits Y1, Y2 are established by the operator. Consequently, if no override of these limits has occurred, the presence of the code word in register 64 will reset each of counters 53 and 54.

This approach achieves synchronization of the memory with the raster generation because each register of the memory, when the latter enters a new field shift mode, will have the same contents as when the memory entered the previous field shift mode, unless of course data had been added by gate 56 during the previous field shift mode of the memory. Consider that the memory is out of synchronism with the raster generation, and that the code word is detected by decoder 101 between lines 34 and 267, for example, about line 40. In such case, the counter 53 may contain the number 3 and counter 54 may be cleared. But the enabling of gates 102 and 103 by decoder 101 will change the contents of counter 53 to the number 95 and the contents of counter 54 to 127. The remaining shift pulses applied to the memory address register during the generation of lines 41 through 227 will be counted so that when the memory completes its field shift mode, the counter 53 and 54 will contain the complement of the numbers at which the code word was detected. Now, the memory enters its retrace mode. After 11,520 pulses, this mode will terminate because the contents of counters 53 and 54 will be 95 and 127 respectively. When the memory again enters its field shift mode, the code word will be contained in register 64, and the memory will be in synchronism.

The code word is in reality a word forbidden for use as a data word. For example, it can be the number 255 if counter 50 is denied the ability to count to this number. In such case, the highest count that can be accumulated is 254 (corresponding to 255 stimuli in an elemental area). The code word is inserted into register 55 of the memory when gate 106 is enabled by the operator as he prepares to start a scan by clearing the memory. Once the code word is inserted, shifting of the memory will always be halted, in the absence of a shift beyond the preset limits, with the code word contained in register 64 as the memory enters a field shift mode. Note that the detection of the code word when the memory is in its retrace shift mode occurs when gate 107 is disabled thus blocking the transfer of the contents of registers 104 and 105 into counters 53 and 54 respectively.

Figure 7:
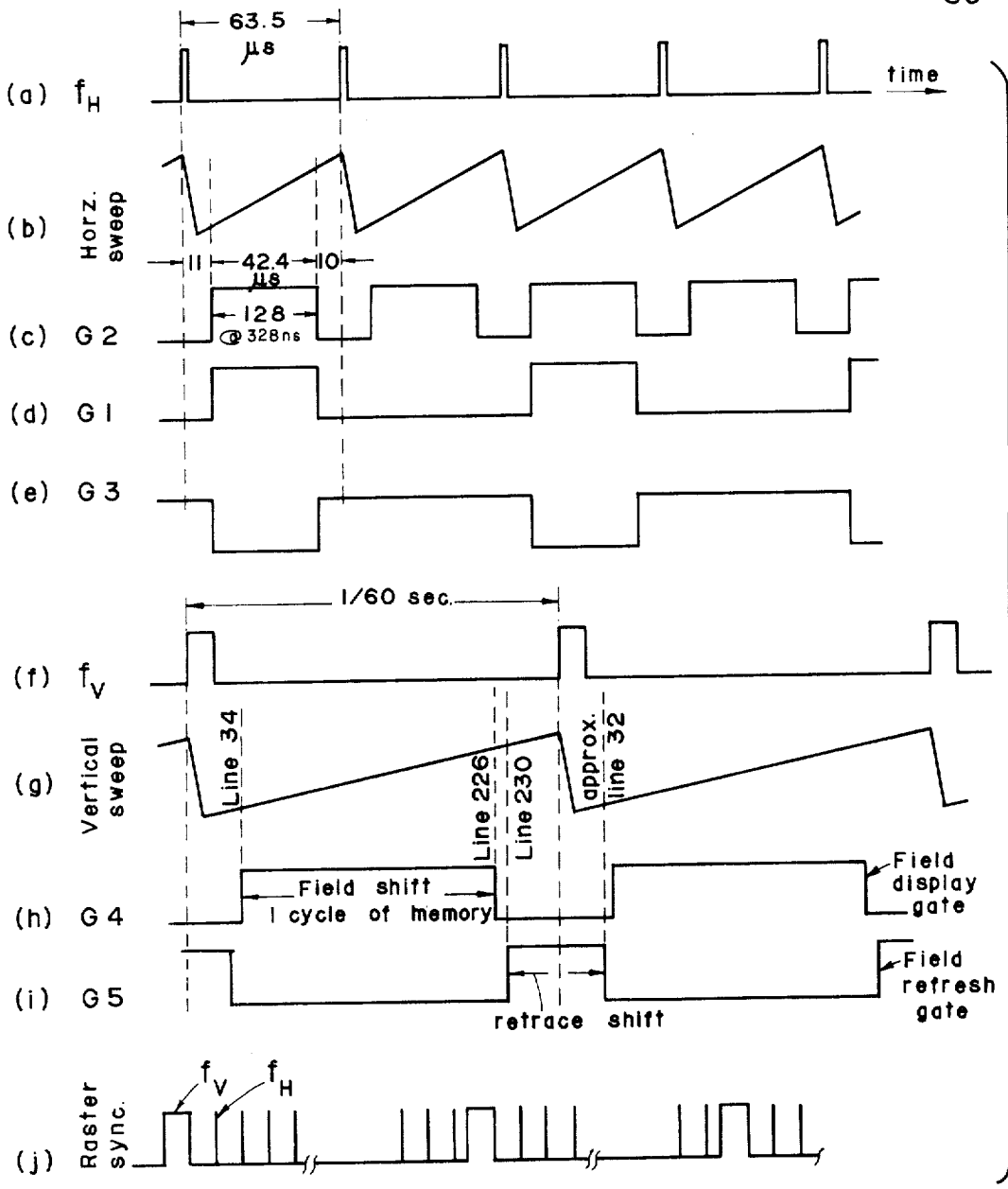
FIG. 7 is a series of time diagrams showing the relationship of the various control signals to the TV sync signals.

The picture elements on the TV tube are modulated in accordance with the contents of the memory using the line refresh register 67 which comprises 128 shift registers and accommodates one complete syllable of the memory. Shifting of the register 67 occurs when the 3,024 MHz clock is gated into the shift line 108 by enabling gate 68 with gate signal G2. As seen from FIG. 7, a G2 gate pulse occurs after each horizontal line sync signal. From a further inspection of FIG. 7, it can be seen that during the first G1 gate pulse, during which the contents of register 70 are transferred into syllable register 71, etc. of memory 13, the contents of syllable register 70 will also be transferred into register 67 through gate 65. During this first G1 gate pulse, gate 109 is disabled by control signal G3, so that the previous contents of register 67 are lost. When the next G2 gate pulse appears, 128 shift pulses are applied to register 67 circulating the contents through the register exactly once because, in this interval of time, gate 109 is enabled by the G3 control signal. During this circulation, no shifting of the registers of memory 13 occur. When the next G2 gate signal appears, the above described process is repeated.

The contents of output register 72 of the line refresh register 67 is coupled to logic memory 73 through a gate 74 whenever the G2 pulse is present or whenever the G4 pulse is not present providing blanking of the electron gun means of the television tube except when data is to be displayed. In this manner, the output of logic means 73, when coverted to analogue signal in digital-to-analogue converter 75, can be used to modulate the picture elements on the TV screen. The contents of register 72 change every 328 during a G2 pulse as the 128 registers of the line refresh register 67 are circulated through one cycle in approximately 42.2 $\mu$ sec. in synchronism with the generation of one line of the raster. The data are displayed on each of two successive lines of successive fields of the raster as shown in FIG. 8.

The digital signal at the input to logic means 73 is representative of the raw data contained in the memory, i.e., the count at each elemental area of the scanned radiation field. Such data can be processed by logic means 73 to subtract from the number at the input a constant quantity representative of background noise, for example, so that the output of logic means will be such as to enhance an understanding of the display. By providing manual adjustment for the logic means, the operator may try different subtractions in an effort to optimize the display, all without disturbing the original data. Alternatively, the logic means may provide other data processing operations such as selection of registers in the memory with counts within a predetermined range, and the display of their location. As a further alternative, logic means 73 and converter can be arranged so that the output of the converter can drive a color TV tube in which the color of a picture element is a measure of the count. For example, high counts can be displayed in red and low counts in colors at the other end of the spectrum. In such case, suitable matrixing of the analogue signals is required.

As pointed out above, the time required to obtain the count of the radiation stimuli emanating from a given elemental area of the scanned radiation field is considerably longer than the time required to present the contents of the memory 13 to the TV tube 14 for display purposes. In fact, the contents of the memory is displayed on the tube 60 times per second, while the scan of an elemental area is in the order of magnitude of seconds. Furthermore, the buffer register 52 associated with the probe counter 50 may have access to the memory at the current address of the probe 60 times per second with the result that the count associated with a given elemental area is inserted into the memory and displayed on the TV tube substantially at the same time the data is acquired by the probe.

By inspection of the TV tube, as shown in FIG. 1, the operator can ascertain the current location of the probe relative to the organ being mapped. As indicated in FIG. 1, where the phantom lines 80 represent the outline of an organ being mapped, the operator can watch the map of the organ being built up, picture element by picture element. By reason of the operation of the logic means 73, the display seen by the operator will be enhanced in the usual manner (e.g., background subtraction) permitting the operator to ascertain very early in the scanning of the radiation field whether the proper scanning parameters have been selected. The adjustment to logic means 73 provides a convenient way in which the operator may try various types of processing while the scan is being carried out on the patient in order to quickly ascertain whether the scan should be continued or restarted with new scan parameters. At all times, the data originally obtained by the detector and deposited in the memory remains unchanged despite the different processing which is available by reason of logic means 73.

By inspection of the display on tube 14, the operator can also ascertain whether the entire organ is being mapped, or whether a portion of the organ, which possibly may contain medically interesting information, will be included in the map. In the event the limits of the probe must be changed, the procedure described in connection with FIG. 3 may be followed. In such case, the probe will eventually travel beyond the original limit and the preset distant pulses obtained from scalers 40 and 41 will be accumulated in the registers 104 or 105. Each time the code word is detected by decoder 101, the contents of register 104 will be transferred into counter 53, and the contents of register 105 will be transferred into counter 54. Thus, at the end of a field shift mode of the memory, the code word will be contained in register 64 of memory 13, but the memory address register, composed of counters 53 and 54, will be different from zero. When line 230 of a field is detected, the memory goes into its retrace shift mode in which sufficient pulses are applied to the memory address register to cause the counter 53 to stop when it contains the number 95, and the counter 54 to stop when it contains the number 127. At this point in time, the code word will no longer be in register 64 of the memory, but will in fact have been shifted to a new location in the memory determined by the contents of the shaft counters 104 and 105. When the memory again begins its field shift mode at line 34 of the next field, the data contained within memory 13 will be synchronized with the initiation of the generation of the raster such that the data acquired by the probe beyond the original limits will be displayed at the proper spatial location with respect to the data previously acquired by the memory.

Figure 5:
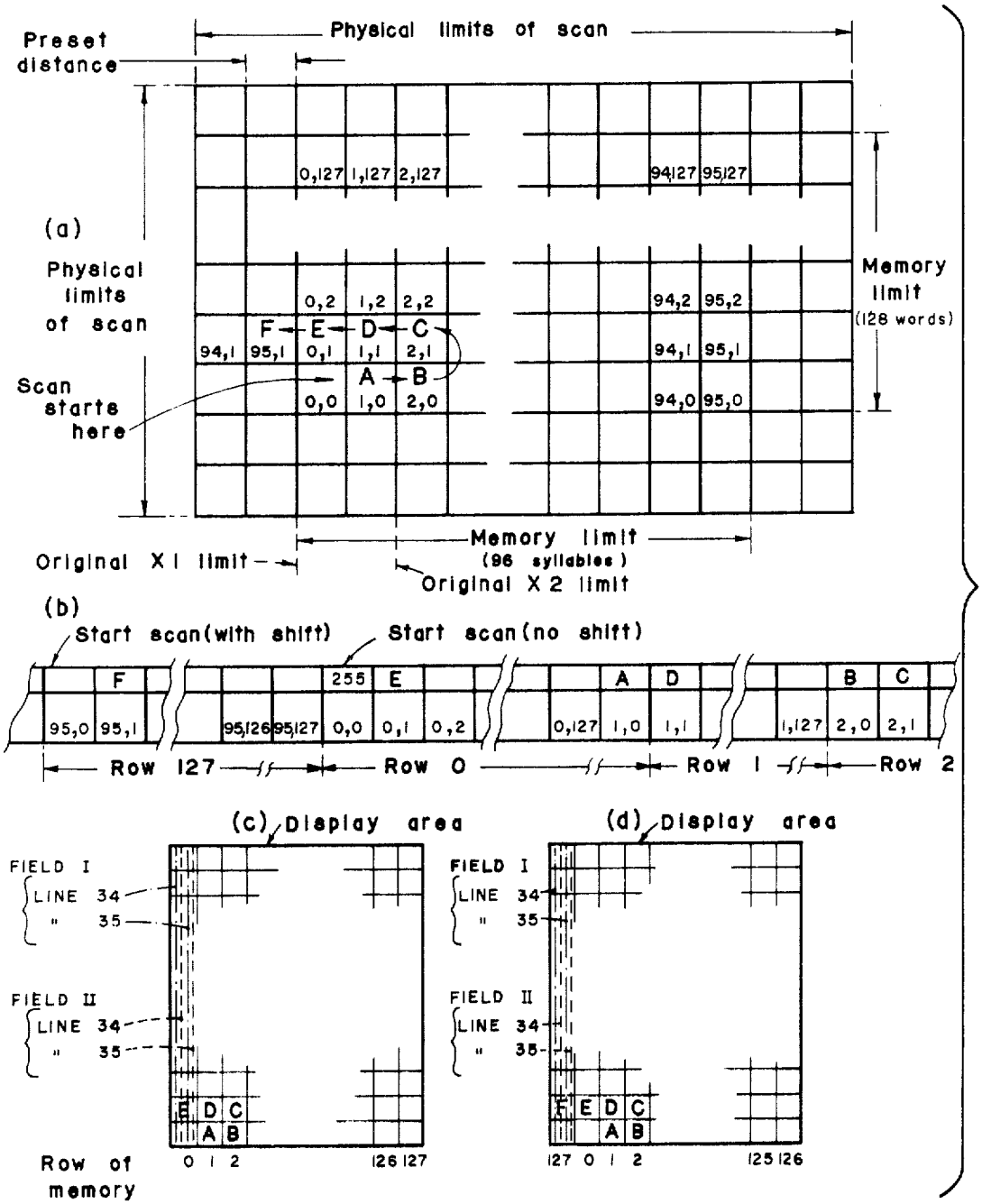
FIG. 5 is a combined chart and schematic representation showing the field scanned by the probe as it relates to the memory and to the pictures presented on the television tube.
Figure 6:
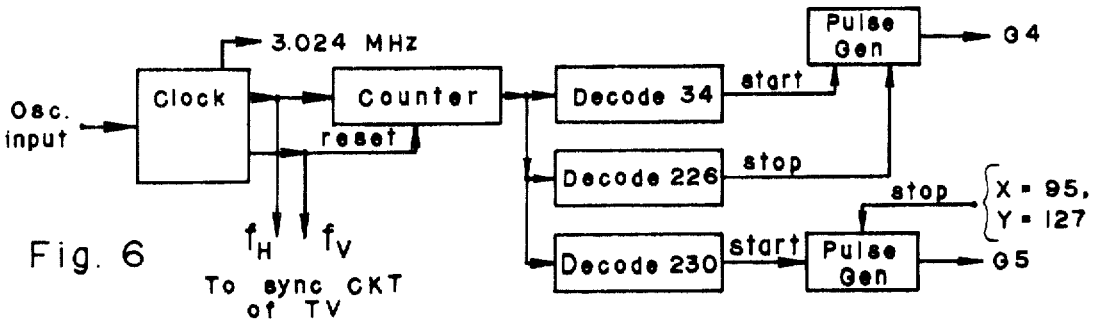
FIG. 6 is a block diagram showing apparatus for generating certain control signals necessary for the operation of the logic shown in FIG. 4.

In order to illustrate the manner in which this type of synchronism occurs, reference is made to FIG. 5, and in particular to portion (a) of the figure which shows a radiation field divided into elemental areas as determined by the scan parameters selected by the operator. For simplicity, it is assumed that the probe scans from the elemental area having address 0,0 (i.e. X=0, Y=0) toward the limit X2 acquiring the count "A" after completing the scan of the elemental area having the address 1,0, etc. Actually, the scan may start at any location in the field. Portion (b) of FIG. 5 shows in schematic form the functional relationship of a group of registers of memory 13, the code word "255" being inserted in the register at memory address 0.0 (i.e., row 0, column 0 of the picture elements). When count "A" has been acquired, it is immediately inserted into address 1,0 of the memory which corresponds to row 1, column 0 of the picture elements. After count "B" has been acquired, the limit X2 is reached and the probe is first driven in the Y direction and then toward the limit X1 eventually completing the scan of the elemental area whose address is 2,1 and acquiring the count "C" which is also inserted in the memory.

As shown in portion (c) of FIG. 5, the [rastor] *raster* begins at the lower left-hand corner of the TV tube and the lines are oriented vertically. As soon as count "A" is acquired by the memory, it is immediately processed and available for display as follows. In the next field following acquisition of this count, no modulation will be applied to the tube during the generation of the first 34 lines of the raster; and no modulation will be applied during generation of line 35, since at this point in time there is no data contained at row "0" of the memory registers. When lines 36 and 37 of the field are generated, the picture tube will be modulated for 328 ns with the contents of the memory at [adress] *address* 1,0 producing a display of the count as processed by the logic means. The scan acquisition of data and display of the contents of the memory point-by-point as shown in portion (c) of FIG. 5.

Assuming now that the operator has decided that he would like to extend the scan to cover a region to the left of limit X1, and in particular the elemental area 99 whose address is −1,0. Counter 42 considers this address as 95,1 and it is in this address that the count "F" is stored as soon as it is acquired. The shift of the probe beyond the limit X1 by one preset distance causes a −1 to be inserted in the counter 104 (in this case the number "95"). After the code word in register 64 is detected, counter 53 is set at 95 and counter 54 is set at "0" since no shifting beyond the Y limit has occurred. The next retrace shift mode of the memory will cause the code word to be displaced to register 98 of syllable register 71 on the memory. Count "F," however, will be contained in register 97 of syllable 70 with the result that the display will have the form shown in portion (d) of FIG. 5. Thus, the original display (c) has been shifted to the right (d) by the same number of preset distances as the probe has progressed leftward beyond the original limit X1. In this manner, the video-display-processor of the present invention automatically accommodates itself to a change in the scan limits permitting the scan to be enlarged beyond that originally set. This feature eliminates the need to start a new scan in the event of a positioned error in the original scan limits.

It will be apparent to those skilled in the art that the invention is applicable to TV systems other than the 525 line system and which have different frequencies for the horizontal and vertical sync pulses. Furthermore, more or less than 192 lines of the TV tube can be utilized for the display, which may start at some line other than line 34.

It should also be apparent to those skilled in the art that the particular code word described above is not significant and that other code words could be used. As a matter of fact, several different code words could be utilized for the purpose of shifting the mode of operation of the logic means if this is considered to be desirable.

As a further modification means may be provided for injecting into the memory 13, at the proper location, data which will permit a cross-hair visual pattern to be displayed on the tube at a fixed or movable location. In such case, the logic means 73 may provide for obtaining the actual count of any picture element of the display utilizing the cross-hair pattern for identification purposes.

Another advantage of the present invention is the retention in the memory, subsequent to its acquisition, of all of the data acquired during scanning of the radiation field. This raw data, which can be processed as determined by the operator during scanning, then may be transferred and stored on a magnetic tape for later processing and display. Having a processed display available in real time is medially advantageous and is a primary advantage of the present invention.

As indicated previously, the memory 13 utilizes a plurality of solid state shift registers. In the preferred form of the invention, the basic component of the memory is a MOS-dynamic shift register of the type currently manufactured by Intel Corporation and designated 1401A, containing 1024 bits per package. With an 8 bit word, one package defines 128 words or one syllable. With this type of memory component, the stray capacitance associated with the gates of the MOS-transistors is used to store information. Such memory components, however, require some minimum frequency of shifting in order to prevent the loss of information. In the present invention, the approximately 4 ms between the end of one field (line 226) and the beginning of the next field (line 34) might, under some conditions, result in the loss of information in the memory were it not for the retrace shift mode of operation of the memory. Such mode of operation thus achieves two results: it shifts the memory to prevent loss of stored information, and it provides synchronization as described above. It is possible, of course, to utilize dynamic shift registers that will maintain their stored information without being shifted during the 4 ms interval referred to above; and static shift registers can also be used. In either of these cases, synchronization can be achieved during the second field of every frame rather than between fields as shown in the drawings.

What is claimed is:

1. A video-display-processor for producing an on-line display of distribution density of radiation stimuli emitted by a radiation field, comprising:

a. a probe for detecting the stimuli and a counter for accumulating the number of stimuli detected;

b. motorized means to cause the probe to traverse the field and sequentially scan a preselected number of elemental areas, each having a preselected size, for causing the probe counter to accumulate the number of stimuli that occurred during the scan of each elemental area;

c. a memory;

d. means for transferring into the memory the number of stimuli accumulated during the scan of each elemental area upon the completion of the scan thereof;

e. a TV display having a CRT with a viewing screen and means to periodically generate a raster of modulatable picture elements on the screen prior to completion of the scanning of all of the elemental areas of the field; and f. means for modulating the picture elements in accordance with the contents of the memory.

2. A video-display-processor according to claim 1 wherein the means for generating the raster generates interlaced fields of lines, each picture element comprising a portion of two sequential lines of the other field.

3. A video-display-processor according to claim 1 wherein the memory is a solid state memory.

4. A video-display-processor according to claim 1 wherein the memory comprises a plurality of shift registers, each of which is associated with respective elemental areas of the radiation field, and the contents of the probe counter, upon completion of the scan of an elemental area, is transferred to the register associated with the last mentioned area.

5. A video-display-processor according to claim 4 including means to circulate the memory through one complete cycle by shifting the contents of the registers in synchronism with the generation of the raster.

6. A video-display-processor according to claim 5 including means to circulate the memory through one complete cycle beginning a pre-determined period of time subsequent to initiation of the generation of a raster and ending before the completion thereof, a memory address register incremented on each shift of the memory, means to shift the memory before the generation of the next raster is initiated and until the memory address register contains a number equal to the number of shifts required to circulate the memory through one cycle, means to insert a code word in one of the registers, and means responsive to detection of the code word during circulation of the memory for resetting the memory address register.

7. A video-display-processor according to claim 6 including limit selector means adjustable prior to the start of the scan of the radiation field to establish an initial limit of traverse of the probe in a given direction, and adjustable subsequent to the start of the scan but before the scan of all of the elemental areas is completed for [overiding] *overriding* the initial limit, a shift counter responsive to an [overide] *override* of the initial limit for counting the number of elemental areas beyond the initial limit scanned by the probes, and means for inserting the contents of the shift counter into the memory [adress] *address* register when the code word is detected.

8. A video-display-processor according to claim 7 including a probe address register incremented by the traverse by the probe of radiation field and whose contents at the completion of the scan of an elemental area constitute the address of such area, comparator means for comparing the contents of the probe address register at the end of the scan of an elemental area with the contents of the memory [adress] *address* register and transferring the contents of the probe counter into the memory when the contents of the probe address register and the memory address register are equal.

9. A video-display-processor for producing an on-line display of the distribution density of radiation stimuli emitted by a radiation field, comprising:

a. a probe for detecting stimuli and a counter for accumulating the number of stimuli detected;

b. motorized means to cause the probe to traverse the field and sequentially scan a preselected number of elemental areas, each having a preselected size, for causing the probe counter to accumulate the number of stimuli that occur during the scan of each elemental area;

c. a plurality of memory registers respectively associated with the elemental areas of the radiation field;

d. means responsive to completion of the scan of an elemental area of the radiation field for transferring the contents of the probe counter into the memory register associated with the scanned elemental area;

e. a TV display having a CRT with a viewing screen, electron gun means for generating at least one electron beam, and deflection means for causing the beam to periodically generate a raster on the screen;

f. logic means to sequentially sample the contents of the memory registers in synchronism with the generation of the raster for producing processed data without changing the contents of the memory registers; and g. a digital-to-analoque converter to convert the processed data into a control signal for modulating the beam while it generates the raster.

10. A video-display-processor according to claim 9 wherein the logic means subtracts a constant from the number sampled from each memory register to produce a processed number which is supplied to the digital-to-analogue converter without changing the original number in the memory register.

11. A video-display-processor according to claim 9 wherein the screen produces colored light, the hue of the light produced by a picture element being determined by the amplitude of the output of the converter when the picture element is scanned by the beam.

12. A video-display-processor according to claim 9 wherein the synchronization of the sampling of the contents of the memory register by the logic means with the generation of the raster causes the modulation of the beam to produce a display area on the screen covering less than the entire raster.

13. A video-display-processor according to claim 12 including means for manually selecting the memory register that is sampled when the beam reaches the display area of the screen.

14. A video-display-processor for producing an on-line display of the distribution density of radiation stimuli emitted by a radiation field, comprising:

a. means to scan the radiation field for detecting and counting stimuli produced by elemental areas of the field;

b. a plurality of memory registers respectively associated with the elemental areas of the field;

c. means responsive to the scan of an elemental area of the field for storing a number representing the stimuli counted during the scan of such elemental area in the register associated therewith;

d. a TV display having a CRT with a viewing screen, electron gun means for generating an electron beam means, and a deflection circuit for causing the beam means to periodically scan the screen and generate a flicker-free raster;

e. logic means to sequentially read-out the memory registers, non-destructively, in synchronism with the scan of the screen for producing digital data functionally related to the contents of the registers; and f. means responsive to the digital data for modulating the beam means in conformity therewith.

15. A video-display-processor according to claim 14 wherein the screen produces colored light, the modulation of the beam means changing the color of the light produced by the screen.

16. A video-display-processor according to claim 14 including means for periodically [resynchronizing] *re-synchronizing* the reading-out of the memory registers with the scan of the screen.

17. A video-display-processor according to claim 16 wherein re-synchronizing takes place at the end of the generation of each raster.

*18. A video-display-processor for displaying the distribution density of a field comprising:*

*a. a plurality of memory registers respectively associated with the elemental areas of the field;*

*b. means responsive to the field for accumulating data numbers in the registers after a predetermined period of time, each data number being representative of the density of the elemental area of the field with which the register is associated;*

*c. a display having a CRT with a viewing screen, electron gun means for generating an electron beam means, and a deflection circuit for causing the beam means to scan the screen in a raster whose period is many times smaller than said predetermined period of time;*

*d. logic means to sequentially read-out the memory registers, non-destructively, in synchronism with the scan of the screen for producing digital data functionally related to the contents of the register; and*

*e. means responsive to the digital data for modulating the beam means in conformity therewith;*

*f. the memory registers being read-out in the order that causes the density of the elemental areas of the field to be reproduced on the screen in proper spatial relationship.*

*19. A video-display-processor according to claim 18 wherein the screen produces colored light, the color of the light of an elemental area of the screen being determined by the magnitude of the data number contained in a memory register that is read-out simultaneously with the scanning of such elemental area.*

*20. A video-display-processor for use with a detector which is responsive to a radiation field for accumulating data numbers after a predetermined period of time, each data number being representative of the density of the respective elemental areas of the field comprising:*

*a. a plurality of memory registers respectively associated with the elemental areas of the field;*

*b. means for storing in each register the data number representative of the density of the elemental area of the field with which the register is associated;*

*c. a TV display having a CRT with a viewing screen, electron gun means for generating an electron beam means, and a deflection circuit for causing the beam means to scan the screen in a raster whose period is many times smaller than said predetermined period of time;*

*d. logic means to sequentially read-out the memory registers, non-destructively, in synchronism with the scan of the screen for producing digital data functionally related to the contents of the registers; and*

*e. means responsive to the digital data for modulating the beam in conformity therewith;*

*f. the memory registers being read-out in the order that causes the density of the elemental areas of the field to be reproduced on the screen in proper spatial relationship.*

*21. A video-display-processor for producing an on-line display comprising:*

*a. a CRT having a screen and a modulatable beam that scans the screen in a raster;*

*b. a memory having a plurality of registers;*

*c. means to sequentially read-out the contents of the registers, non-destructively, in synchronism with the scan of the screen, for modulating the beam in accordance with the contents of the registers; and*

*d. detector means responsive to radiation stimuli emitted by a radiation field for storing data in the memory during the time the contents of the registers are being sequentially read-out.*

*22. A video-display-processor for producing an on-line display of the distribution density of radiation stimuli emitted by a radiation field comprising:*

*a. a plurality of memory registers respectively associated with the elemental areas of the field;*

*b. means for accumulating data in the registers, the data being representative of the number of stimuli emitted by the elemental area of the field with which the register is associated so that the density of radiation stimuli emitted by an elemental area of the radiation field is established by the contents of a register after the lapse of a predetermined period of time;*

*c. a display having a CRT with a viewing screen, electron gun means for generating an electron beam means, and a deflection circuit for causing the beam means to periodically scan the screen at a rate sufficiently high to generate a substantially flicker-free raster, the period of the scan being much smaller than said predetermined period of time;*

*d. logic means to sequentially read-out the memory registers, non-destructively, in synchronism with the scan of the screen for producing digital data functionally related to the contents of the registers; and*

*e. means responsive to the digital data for modulating the beam means in conformity therewith whereby the distribution density of the field is displayed on the screen during the time data are being accumulated in the registers.*

* * * * *